US009679415B2

(12) United States Patent
Takemoto

(10) Patent No.: US 9,679,415 B2
(45) Date of Patent: Jun. 13, 2017

(54) IMAGE SYNTHESIS METHOD AND IMAGE SYNTHESIS APPARATUS

(71) Applicant: CANON KABUSHIKI KAISHA, Tokyo (JP)

(72) Inventor: Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 14/728,899

(22) Filed: Jun. 2, 2015

(65) Prior Publication Data

US 2015/0356785 A1 Dec. 10, 2015

(30) Foreign Application Priority Data

Jun. 6, 2014 (JP) ................ 2014-117890

(51) Int. Cl.
| | | |
|---|---|---|
| G09G 5/00 | (2006.01) |
| G06T 19/00 | (2011.01) |
| G06K 9/00 | (2006.01) |
| G06T 7/11 | (2017.01) |
| G06T 7/90 | (2017.01) |

(Continued)

(52) U.S. Cl.
CPC ........ *G06T 19/006* (2013.01); *G06K 9/00355* (2013.01); *G06T 7/11* (2017.01); *G06T 7/194* (2017.01); *G06T 7/90* (2017.01); *G06K 9/4652* (2013.01); *G06T 2207/10024* (2013.01); *G06T 2207/20221* (2013.01); *G06T 2210/41* (2013.01)

(58) Field of Classification Search
None
See application file for complete search history.

(56) References Cited

U.S. PATENT DOCUMENTS 5,594,850 A * 1/1997 Noyama ............... G06T 15/405
345/632
9,536,454 B2 * 1/2017 Takeuchi ............. G09B 29/106
(Continued)

FOREIGN PATENT DOCUMENTS

| JP | 2002-209082 A | 7/2002 |
| JP | 2005-107697 A | 4/2005 |
| JP | 2005-228140 A | 8/2005 |

OTHER PUBLICATIONS

Hayashi, et al., "Depth Determination of Real Objects using Contour Based Stereo Matching", TVRSJ, (2005), pp. 371-380, vol. 10, No. 3.

*Primary Examiner* — Ryan R Yang
(74) *Attorney, Agent, or Firm* — Canon USA, Inc. I.P. Division

(57) ABSTRACT

In order to easily and rapidly determine a subject region in a captured image using a single image, a synthesized image of an extraction image including a subject and an instruction image representing a first acquisition region from which color information on the subject is acquired is used. Color information on the subject is acquired from the first acquisition region represented by the instruction image in the synthesized image. Color information on a background of the subject is acquired from a region not including the first acquisition region and a color information non-acquisition region that is adjacent to the first acquisition region and is set in advance in the synthesized image. On the basis of the color information on the subject and the color information on the background, extraction information of the subject is determined and output.

17 Claims, 10 Drawing Sheets

(51) Int. Cl.
*G06T 7/194* (2017.01)
*G06K 9/46* (2006.01)

(56) References Cited

U.S. PATENT DOCUMENTS

| | | | | |
|---|---|---|---|---|
| 2003/0185461 | A1* | 10/2003 | Ohshima | G06T 19/006 382/284 |
| 2004/0151376 | A1* | 8/2004 | Nomura | G06K 9/00248 382/181 |
| 2006/0061598 | A1* | 3/2006 | Mino | G06K 9/00228 345/629 |
| 2012/0069051 | A1* | 3/2012 | Hagbi | G06T 19/006 345/633 |
| 2012/0262486 | A1* | 10/2012 | Raghoebardajal | G06F 3/011 345/633 |
| 2013/0222424 | A1* | 8/2013 | Morinaga | G06T 19/006 345/629 |

* cited by examiner

IMAGE SYNTHESIS METHOD AND IMAGE SYNTHESIS APPARATUS

BACKGROUND OF THE INVENTION

Field of the Invention

The present invention relates to an image synthesis method and an image synthesis apparatus, and more particularly, to a technique suitable for use in synthesizing a real image and computer graphics in consideration of a subject region in the real image.

Description of the Related Art

The mixed reality (MR) technology for seamlessly merging virtual space created by a computer and real space is receiving attention, and is expected to be applied to various fields such as assembly support in which an operation procedure and a wiring condition are superimposed and displayed at the time of assembly and surgery support in which the internal condition image of a patient is superimposed on the body surface of the patient and displayed.

A geometric consistency between a virtual object and real space is important in allowing a user to feel that the virtual object is present in the real space. There are two types of geometric consistency in the mixed reality, consistency for making the coordinate system of real space and the coordinate system of virtual space conform to each other and consistency for correctly representing a positional relationship between a real object and a virtual object in the depth direction. A problem associated with the latter consistency is also referred to as an occlusion problem. In particular, the occlusion problem is crucial for a video see-through MR system that superimposes a virtual object on an image captured by a camera. The present invention deals with the latter consistency, i.e., the occlusion problem.

Japanese Patent Laid-Open Nos. 2005-107967 and 2005-228140 solve the occlusion problem by drawing a hand as a subject in front of a virtual object at the time of synthesis. It is statically shown that a hand is often located in front of a virtual object. By always drawing a hand image region in front of a virtual object so as to prevent a hand located in front of the virtual object from being hidden, a viewer does not feel unnatural.

Referring to Japanese Patent Laid-Open No. 2005-107967 (hereinafter referred to as Patent Document 1), the difference between an image captured as a background and an image obtained by capturing the background and a subject at the same time is extracted as the color information on the subject and a region having the extracted color information is set as a subject region.

Referring to 2005-228140 (hereinafter referred to as Patent Document 2), only a single image obtained by capturing a subject and a background at the same time is used to extract color information. This image is displayed on a screen and a user interface allowing a user to separate the subject and the background is provided. A user can set a subject region as intended with the user interface.

Referring to Kenichi Hayashi, Hirokazu Kato, and Shougo Nishida, "Depth Determination of Real Objects using Contour Based Stereo Matching", Transactions of The Virtual Reality Society of Japan, Vol. 10, No. 3, pp. 371-380, 2005 (hereinafter referred to as Non-Patent Document 1), the data of a depth of a hand from a camera and the data of a depth of a virtual object from the camera are compared in units of pixels and a foreground region is drawn. As a result, the occlusion problem is more accurately solved. Non-Patent Document 1 determines a subject region as follows:

(1) A space image to be the background of a subject is stored in the form of a three-dimensional texture;

(2) A background image is rendered in accordance with the current position and orientation of a camera;

(3) The rendered background image and a current image are compared to calculate a differential region; and (4) The differential region is determined as a subject region.

Referring to Patent Document 1, it takes time to capture two images, a background image and an image including a background and a subject that is a hand, which are used for the determination of a region of the hand. On the other hand, referring to Patent Document 2, a subject region can be determined using a single image including a background and a subject. However, it takes time to manually register color information which an operator uses to separate the subject region and a background region. In addition, knowledge and experience are required for the registration of the color information. Not everybody can easily do the registration.

In order to stably extract a subject region in real time from an image captured by a camera having a movable viewpoint, it is necessary to capture a plurality of images of a subject and a background from different viewpoints. The increase in the number of images increases the time taken to determine a subject region.

Referring to Non-Patent Document 1, it is necessary to store a background on which a subject will be probably displayed as a three-dimensional image. It is therefore necessary to capture in advance a background scene including no subject as an image used as texture data. The increase in the area of the background increases the time taken for a preliminary preparation for this image capturing. Like in the case disclosed in Patent Document 2, in the case disclosed in Non-Patent Document 1, knowledge and experience are required for the acquisition of the texture data and not everybody can easily do the acquisition.

If a person tries a system employing the above-described method with which a long time is required for the determination of a subject region at an exhibition, that is, in a situation where an exhibitor wants as many persons as possible to try the system in a short time, the exhibitor may not adjust the system for the person to prevent the increase in the time spent on the trying. However, if the adequate adjustment of the system is not performed for each person, noise occurs at the time of the extraction of a hand and the hand is not displayed in front of a virtual object. This prevents the person from experiencing an immersive feeling. It has been hoped that there is provided a method with which subject extraction information can be calculated in a short time.

The adjustment of color information disclosed in Japanese Patent Laid-Open No. 2005-228140 and the acquisition of texture data disclosed in Non-Patent Document 1 require a long preparation time. It is difficult to adopt such methods for a time-pressured scene.

The present invention provides an information processing apparatus capable of easily and rapidly determining a subject region in a captured image using a single image.

SUMMARY OF THE INVENTION

An information processing apparatus according to an embodiment of the present invention includes a display control unit configured to generate a synthesized image by synthesizing an extraction image including a subject and an instruction image representing a first acquisition region from which color information on the subject is acquired and display the synthesized image on a display unit; a subject color information acquisition unit configured to acquire color information on the subject from the first acquisition region represented by the instruction image in the synthesized image; a background color information acquisition unit configured to acquire color information on a background of the subject from a region not including the first acquisition region and a color information non-acquisition region that is adjacent to the first acquisition region and is set in advance; a subject extraction information determination unit configured to determine extraction information of the subject on the basis of the color information on the subject acquired by the subject color information acquisition unit and the color information on the background acquired by the background color information acquisition unit; and a subject extraction information output unit configured to output the extraction information of the subject determined by the subject extraction information determination unit.

According to an embodiment of the present invention, it is possible to more rapidly determine a subject region in an image captured by a camera having a movable viewpoint by creating an instruction image used to extract subject information.

Further features of the present invention will become apparent from the following description of exemplary embodiments with reference to the attached drawings.

DESCRIPTION OF THE EMBODIMENTS

First Embodiment

An embodiment of the present invention will be described in detail below with reference to the accompanying drawings.

In this embodiment, a hand 150 of a user is a subject. Exemplary switching between a subject region determination mode in which the region of the hand 150 captured by the camera 10 is determined and a display (experience) mode in which a real image including the hand 150 and an image of a CG model 160 (CG model image) are synthesized and displayed on the basis of a subject region.

Figure 1:
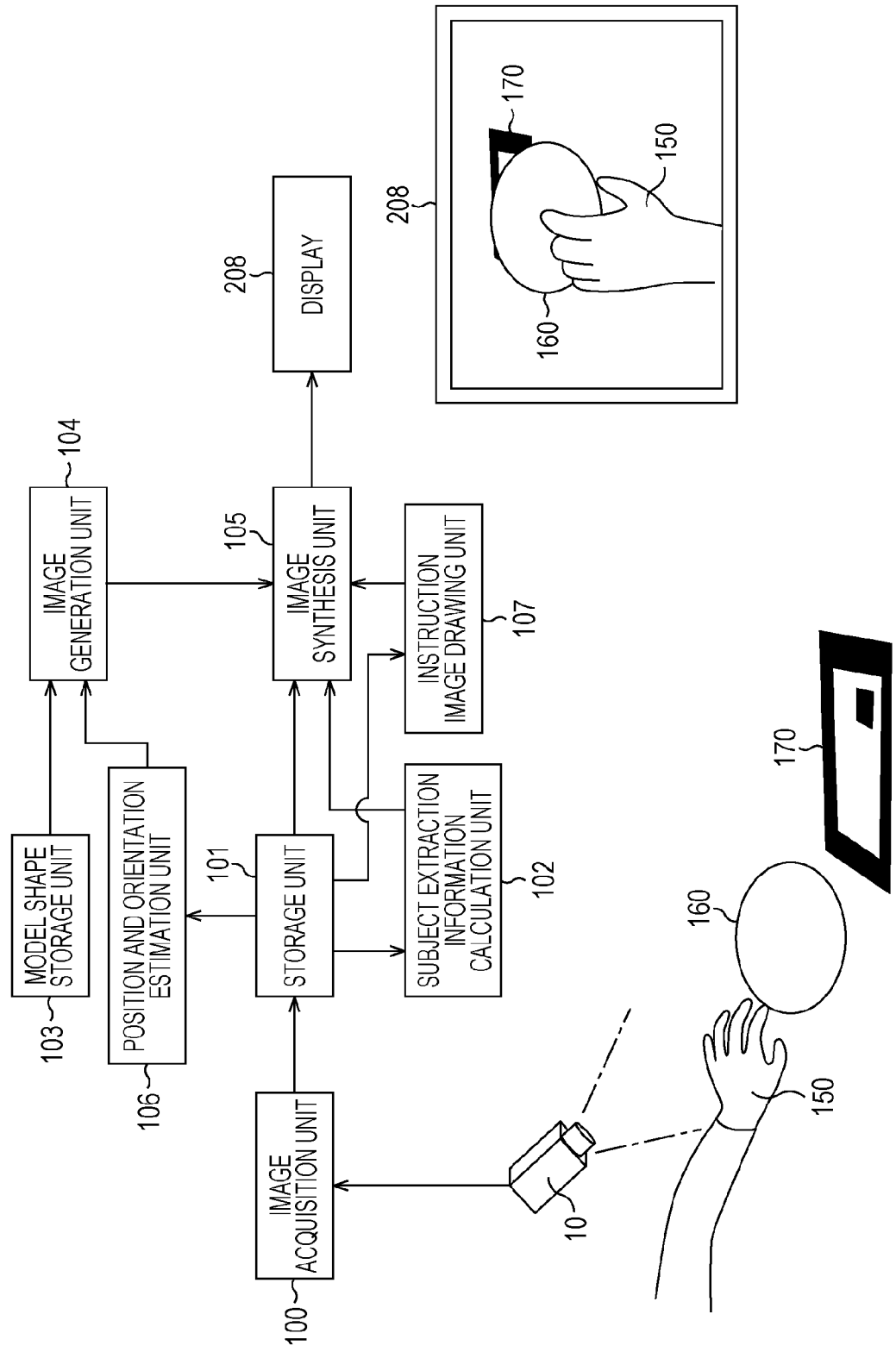
FIG. 1 is a schematic diagram illustrating the functional configuration of a real-time image synthesis apparatus according to a first embodiment of the present invention.

FIG. 1 is a schematic diagram illustrating the functional configuration of a real-time image synthesis apparatus according to this embodiment.

Figure 2:
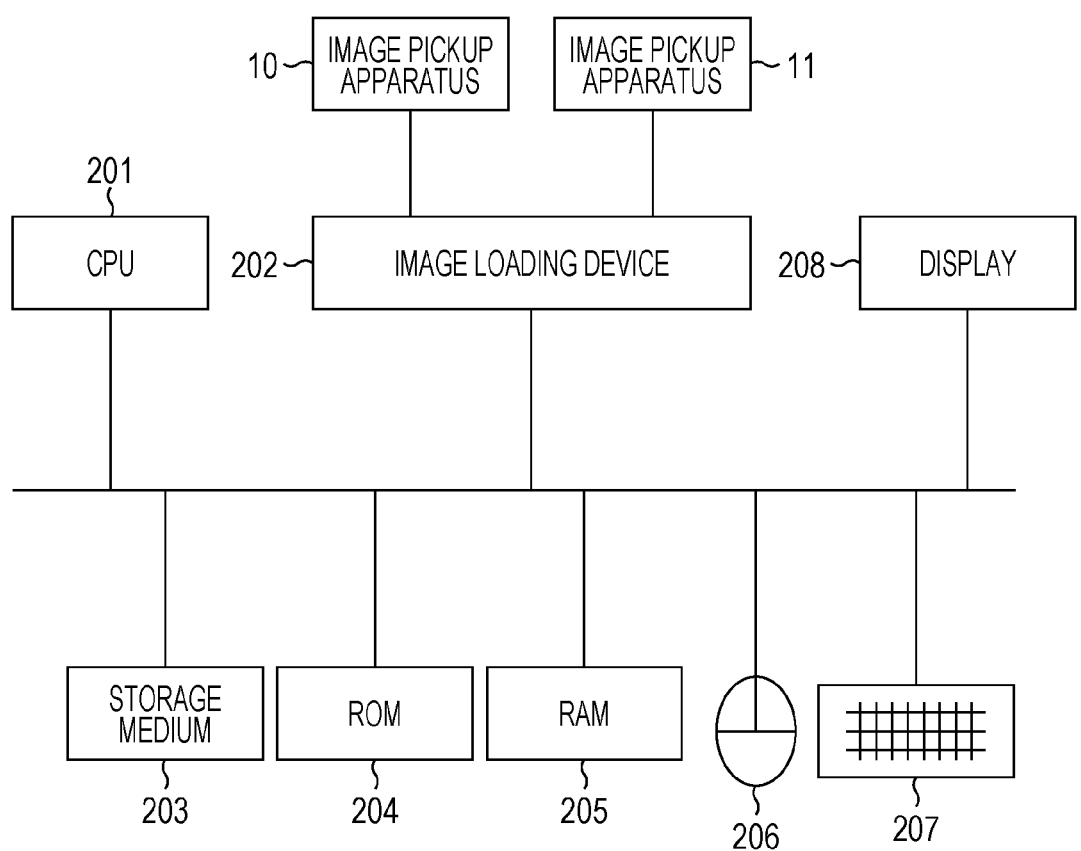
FIG. 2 is a block diagram illustrating the hardware configuration of a real-time image synthesis apparatus according to the first embodiment.

FIG. 2 is a block diagram illustrating the hardware configuration of a real-time image synthesis apparatus according to this embodiment.

The real-time image synthesis apparatus illustrated in FIG. 2 includes a CPU 201, an image loading device 202, a storage medium 203, a Read-Only Memory (ROM) 204, a Random Access Memory (RAM) 205, a mouse 206, a keyboard 207, and a display 208. An exemplary case in which only one of two image pickup apparatuses 10 and 11, the image pickup apparatus 10 in this embodiment, is used as the camera 10 will be described.

The image acquisition unit 100 acquires an image captured by the camera 10.

Figure 3A:
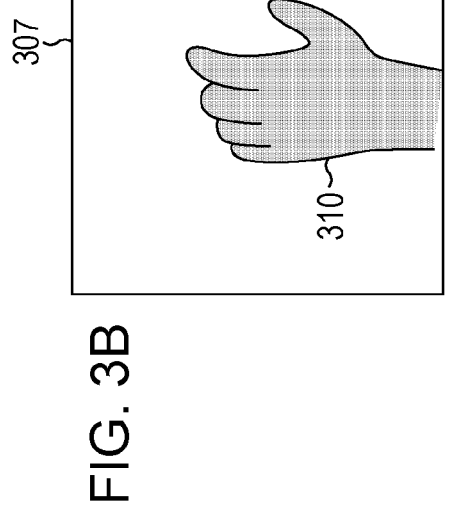
FIGS. 3A, 3B, and 3C are schematic diagrams illustrating a real image, an instruction image, and a synthesized image, respectively, according to the first embodiment.

FIG. 3A illustrates an exemplary acquired image. A real image 305 captured by the camera 10 includes the hand 150 of a user and a marker 170 used for the measurement of the position and orientation of the camera 10.

The storage unit 101 temporarily stores the real image 305 acquired by the image acquisition unit 100. Image data is transmitted from the image acquisition unit 100 in, for example, 1/30 second. The storage unit 101 has operational mode flags used to hold two system operational modes, the display mode and a subject extraction information calculation mode, and also has instruction flags used to transmit a color information acquisition instruction to an instruction image drawing unit 107 in response to a user's input operation performed with the keyboard 207 and the mouse 206.

A subject extraction information calculation unit 102 performs subject extraction information acquisition processing for acquiring the latest image captured by the camera 10 and stored in the storage unit 101 and calculates the subject extraction information of the hand 150 in the real image 305. In this embodiment, the subject extraction information is a color coordinate value list in a YCbCr color system that is multidimensional space.

In the present invention, the subject extraction information is not limited to the color coordinate value list in the YCbCr color system. Any information with which a subject can be extracted in real time can be used. For example, a color coordinate value list in the RGB color system may be used as the subject extraction information. A method of determining the region of the hand 150 in the real image 305 in real time will be described later.

The subject extraction information calculation unit 102 outputs to the image synthesis unit 105 the region of the hand 150 in the image captured by the camera 10 and stored in the storage unit 101.

A model shape storage unit 103 stores three-dimensional model data of the CG model 160 and three-dimensional model data of the hand 150. These stored pieces of three-dimensional model data are output to the image generation unit 104.

A position and orientation estimation unit 106 measures and estimates the position and orientation of the camera 10. In this embodiment, the position and orientation estimation unit 106 measures and estimates the position and orientation of the camera 10 on the basis of the projected image of the square marker 170 included in the captured image. For example, the position and orientation of a camera can be estimated by binarizing an image, extracting the apices of a quadrangle by straight-line fitting, and minimizing a projection error on an image by a repeat operation based on the hill-climbing method.

An embodiment of the present invention is not limited to the estimation method performed by the position and orientation estimation unit 106. The position and orientation of an image pickup apparatus may be measured using another measurement method, for example, may be measured by an optical motion capture apparatus or a magnetic sensor.

The image generation unit 104 generates the image of the CG model 160 on the basis of the CG model 160 stored in the model shape storage unit 103 and the position and orientation of the camera 10 acquired from the position and orientation estimation unit 106.

Figure 3B:
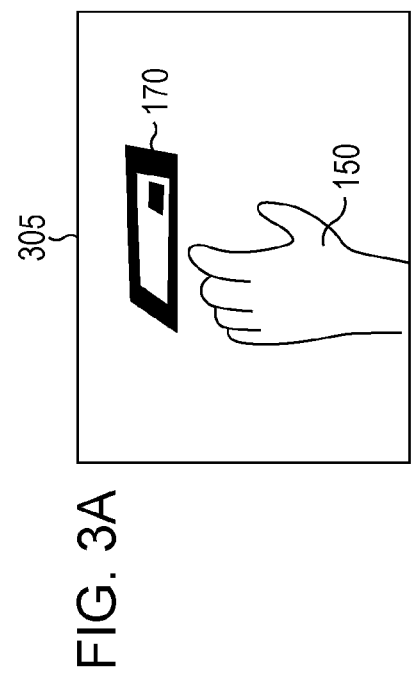
Figure 3C:
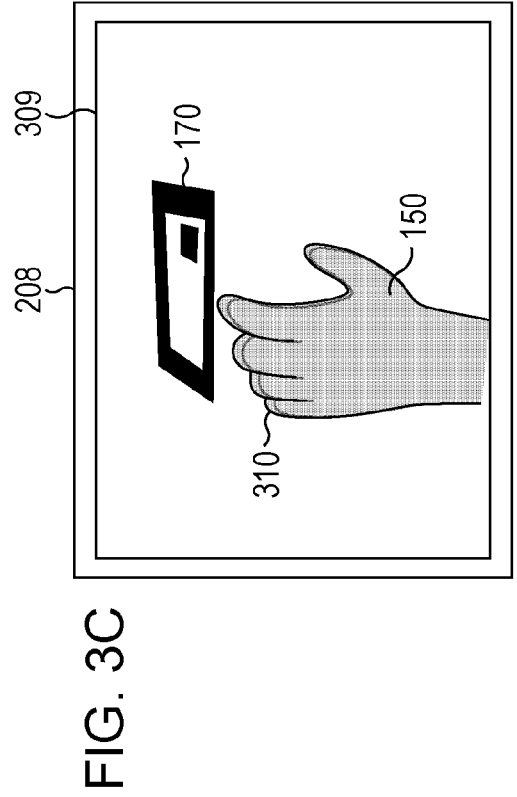

The instruction image drawing unit 107 draws an instruction image 307 as a simple figure on the basis of an instruction flag stored in the storage unit 101. The simple figure is a circle, an ellipse, or a polygon. The instruction image 307 according to this embodiment will be described with reference to FIGS. 3A to 3C.

FIG. 3A illustrates the real image 305 captured by the camera 10 and stored in the storage unit 101. The real image 305 is synthesized with the instruction image 307 illustrated in FIG. 3B and is displayed. A result of the synthesis and the display is a synthesized image 309 illustrated in FIG. 3C.

The instruction image 307 according to this embodiment preferably includes a contour 310 representing the outer shape of the hand 150 that is an input target. The inside of the contour 310 is preferably colored and semitransparent. The outside of the contour 310 is preferably transparent so as not to change the display color of the real image 305 at the time of synthesis. In the present invention, the instruction image does not necessarily have to be semitransparent. Only a contour may be displayed or only a part of the instruction image may be transmissive through dither processing.

In a case where the operational mode flag stored in the storage unit 101 indicates the display mode, the image synthesis unit 105 synthesizes the real image 305 captured by the camera 10 and stored in the storage unit 101 and the three-dimensional image of the CG model 160 generated by the image generation unit 104. The image of the CG model 160 is not drawn in the region of the hand 150 calculated by the subject extraction information calculation unit 102. By not drawing the image of the CG model 160 in the region of the hand 150, the region of the hand 150 is obtained as a subject region (image acquisition region) and the hand 150 is displayed in front of the CG model 160. This can reduce the unnatural visual feeling of a user.

The synthesized image generated by the image synthesis unit 105 is displayed on the display 208. A user can see the synthesized image having the correct positional relationship between the CG model 160 and the hand 150 in the depth direction on the display 208. The user can therefore feel as if the CG model 160 was actually present.

On the other hand, in a case where the operational mode flag stored in the storage unit 101 indicates the subject extraction information calculation mode, the image synthesis unit 105 synthesizes the real image 305 captured by the camera 10 and stored in the storage unit 101 and the instruction image 307 generated by the instruction image drawing unit 107.

Figure 4:
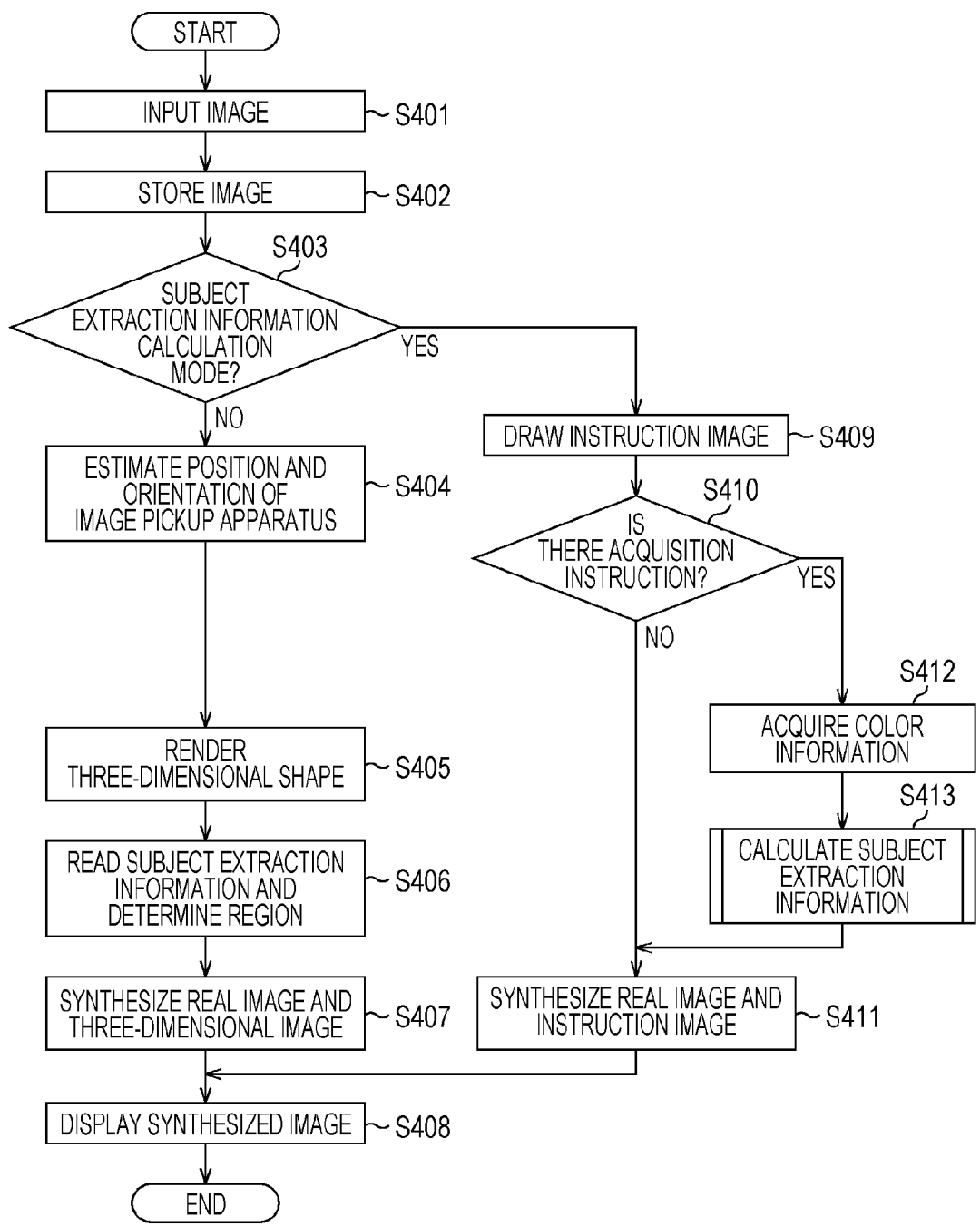
FIG. 4 is a flowchart illustrating an exemplary process performed by a real-time image synthesis apparatus according to the first embodiment.

FIG. 4 is a flowchart illustrating a process performed by a real-time image synthesis apparatus according to this embodiment.

In step S401, the image acquisition unit 100 acquires an image from the camera 10.

In step S402, the storage unit 101 temporarily stores the image acquired by the image acquisition unit 100.

In step S403, the CPU 201 determines which operational mode is set in the storage unit 101. When the operational mode is the display mode, the process proceeds to step S404. When the operational mode is the subject extraction information calculation mode, the process proceeds to step S409.

In step S404, the position and orientation estimation unit 106 estimates the position and orientation of the camera 10. The position and orientation estimated by the position and orientation estimation unit 106 is used to render the three-dimensional shape of the CG model 160 in the image generation unit 104.

In step S405, the image generation unit 104 acquires the three-dimensional model shape of the hand 150 and the shape of the CG model 160 which are stored in the model shape storage unit 10 and the position and orientation of the camera 10 acquired by the position and orientation estimation unit 106. The image generation unit 104 performs three-dimensional shape rendering processing for drawing the image of the CG model 160 viewed from the position and orientation of the camera 10.

In step S406, the image synthesis unit 105 reads subject extraction information and performs subject region determination processing for determining the region of the hand 150 in the image stored in the storage unit 101.

The image synthesis unit 105 determines which of pixels in the image has a color corresponding to each coordinate value in the color coordinate value list and stores the coordinate values of pixels having colors corresponding to coordinate values in the color coordinate value list as a "subject region coordinate value list". The subject region coordinate value list represents a subject region in the image.

At the time of the color determination, the threshold of Y (luminance value) may be set so as to enlarge the range of determination. For example, when a coordinate value is 128 and a threshold value is set to 50, it is determined that a value ranging from 78 to 178 is applicable. The reason why the threshold of Y is set is that an illumination level easily changes as a result of the movement of a subject and it is necessary to stably extract a subject region in real time in such a situation. For the same reason, the thresholds of Cb and Cr (color differences) may be set so as to enlarge the range of determination.

In step S407, the image synthesis unit 105 performs synthesis by writing the image of the CG model 160 generated in step S405 over the real image 305 stored in step S402. Before this synthesis, the image synthesis unit 105 acquires the subject region calculated in step S406. At the time of the synthesis, the image synthesis unit 105 does not draw the image of the CG model 160 over pixels corresponding to the subject region. That is, the real image 305 is displayed in the subject region and a user can visually recognize the hand 150 of the user in front of the CG model 160.

On the other hand, when the operational mode is the subject extraction information calculation mode and the process proceeds to step S409, the instruction image drawing unit 107 generates the instruction image 307.

In step S410, the CPU 201 refers to the instruction flag stored in the storage unit 101 and determines whether the instruction flag indicates ON or OFF. When the instruction flag indicates OFF, the process proceeds to step S411. When the instruction flag indicates ON, the process proceeds to step S412.

For example, when a user performs adjustment so as to superimpose the hand 150 of the user on the contour 310 of the hand in the instruction image and makes an instruction using the keyboard 207 or the mouse 206 after the hand 150 has been superimposed exactly on the contour 310, the instruction flag is set to ON. When the CPU 201 determines that the state of the instruction flag has been changed from OFF to ON, the CPU 201 notifies the subject extraction information calculation unit 102 of a subject extraction information acquisition time.

In step S412, the subject extraction information calculation unit 102 acquires color information on the inner region of the contour 310 in the real image 305. The process proceeds to step S413.

In step S413, the subject extraction information calculation unit 102 calculates subject extraction information on the basis of the color information acquired in step S412. This calculation will be described later with reference to a flowchart illustrated in FIG. 5.

In step S411, the image synthesis unit 105 generates the synthesized image 309 by synthesizing the real image 305 and the instruction image 307.

In step S408, the display 208 outputs the synthesized image generated in step S407 or S411 on a display screen.

Figure 5:
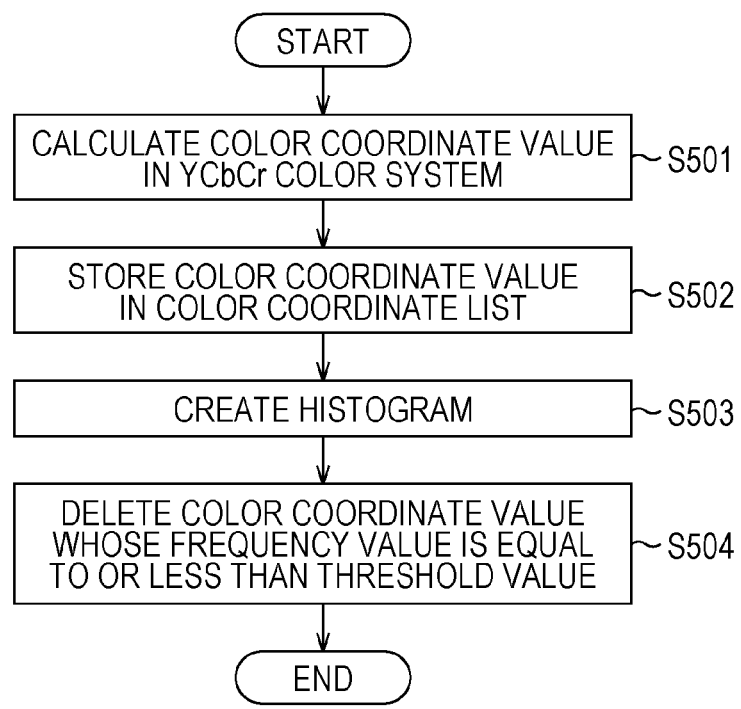
FIG. 5 is a flowchart illustrating a subject extraction information calculation process according to the first embodiment.

Next, the subject extraction information calculation performed in step S413 will be described with reference to the flowchart illustrated in FIG. 5.

In step S501, the subject extraction information calculation unit 102 converts the input color information into a coordinate value in the YCbCr color system.

In step S502, the subject extraction information calculation unit 102 stores the coordinate value calculated in step S501 in the color coordinate list. In this embodiment, Y, Cb, and Cr color coordinate lists are individually generated. A coordinate value ranging from 0 to 255 is stored.

In step S503, the subject extraction information calculation unit 102 creates a color coordinate histogram for each of the three Y, Cb, and Cr color coordinate lists stored in step S502. The color coordinate histogram is created by classifying coordinate values stored in the color coordinate list and calculating the frequency value of each classification.

In step S504, the subject extraction information calculation unit 102 specifies a color coordinate value whose frequency value calculated in step S503 is equal to or less than a predetermined threshold value and deletes the specified color coordinate value from the color coordinate list.

The process from steps S503 to S504 corresponds to noise removal performed in a case where a decoration such as a manicure or a ring or a background other than the hand 150 is included in the inner region of the contour. By performing the noise removal, a background that is not a subject is prevented from being erroneously recognized as a subject region.

As described previously, the subject extraction information calculation unit 102 calculates a color coordinate list from which noise has been removed by performing the process from steps S501 to S504. This color coordinate list is output to the image synthesis unit 105 and is used as a drawing restriction region at the time of the synthesis of the image of the CG model 160.

Through the above-described process, a user can easily and rapidly instruct a real-time image synthesis apparatus to acquire extraction information of the hand 150 of the user and can acquire accurate extraction information without asking another operator to perform adjustment.

In this embodiment, a subject is not limited to a hand and any object that can be determined as a subject on the basis of color information can be applicable. For example, a face or a whole body that is a movable subject or a chair or a desk that is a fixed subject may be applicable.

The present invention is not limited to a case where modes are set and switching between the modes is performed using a single program. For example, a program for determining a subject region in a real image in advance and a program for synthesizing a real image and a CG model image may be individually executed.

Second Embodiment

In the first embodiment, the camera 10 is a monocular camera and subject extraction information is color information. However, the present invention is not limited to a case where a subject region is determined on the basis of color information that is subject extraction information. A case where subject depth information is calculated using two stereo cameras and a subject region is determined on the basis of the depth information is applicable.

In this embodiment, a method of calculating depth information on the hand 150 using a stereo video see-through head-mounted display (HMD) including two cameras and representing the positional relationship between the CG model 160 and the hand 150 in the depth direction on the basis of the depth information will be described.

Figure 6:
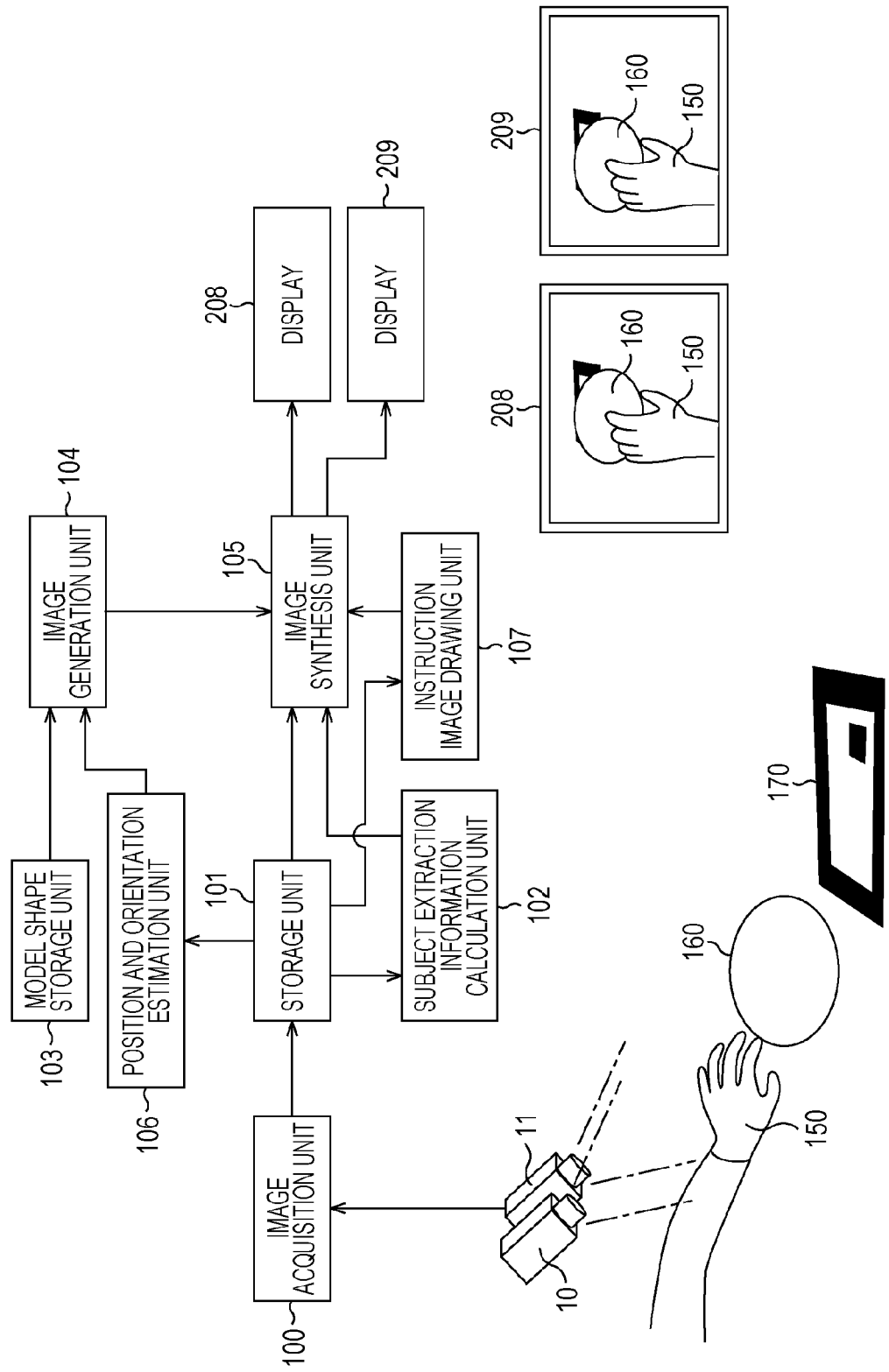
FIG. 6 is a schematic diagram illustrating the functional configuration of a real-time image synthesis apparatus according to a second embodiment of the present invention.

FIG. 6 is a block diagram illustrating the functional configuration of a real-time image synthesis apparatus according to this embodiment.

This embodiment differs from the first embodiment in that a camera 11 and a display 209 are added and there are two cameras and two displays. Since two sets of a camera and display are provided, a user wearing an HMD can have a higher degree of realism of an MR experience. Although not illustrated, the cameras 10 and 11 and the displays 208 and 209 are included in an HMD as stereo displays and are individually secured.

Only points different from the first embodiment will be described below. The other points of which no description is made below are the same as the first embodiment.

The image acquisition unit 100 acquires two images captured by the cameras 10 and 11 and stores them in the storage unit 101.

The subject extraction information calculation unit 102 calculates depth information on an input stereo image using the method disclosed in, for example, Non-Patent Document 1. That is, the contours of the hands 150 in the two images are associated with each other and the depth on the contour is calculated by triangulation on the basis of known stereo camera location information. In addition, the depth values at both ends of the inner region of the contour in the horizontal direction are calculated by linear interpolation. As a result, the depth values of the whole region of the hand 150 can be calculated. Thus, the subject extraction information calculation unit 102 calculates depth information on the region of the hand 150 and outputs the depth information to the image synthesis unit 105.

The image generation unit 104 calculates and stores the depth value of the image of the CG model 160 at the time of the generation of the image of the CG model 160 and outputs the depth value to the image synthesis unit 105.

The image synthesis unit 105 performs the synthesis of the image of the CG model 160 on the basis of the depth information on the hand 150. At that time, a depth value at each pixel in the image of the CG model 160 and a depth value at a corresponding pixel in the region of the hand 150 are compared with each other. When the depth value at a pixel in the image of the CG model 160 is less than that at a corresponding pixel in the region of the hand 150, the pixel in the image of the CG model 160 is drawn.

On the other hand, when the depth value at a pixel in the image of the CG model 160 is greater than that at a corresponding pixel in the region of the hand 150, the pixel in the image of the CG model 160 is not drawn. This processing is performed for all pixels in the image of the CG model 160.

A process according to this embodiment is obtained by changing the process according to the first embodiment illustrated in FIG. 4 as follows.

In steps S401 and S402, images captured by the cameras 10 and 11 are acquired and are stored in the storage unit 101.

In step S406, the image synthesis unit 105 reads the subject region depth value calculated by the subject extraction information calculation unit 102. In step S407, the subject region depth value is compared with the depth value of the image of the CG model 160 and a region positioned closer to the camera is drawn.

In step S413, the subject extraction information calculation unit 102 calculates the depth value of a subject region in a stereo image as described previously.

Thus, in this embodiment, the depth value of the region of the hand 150 is calculated on the basis of information on a stereo camera and the positional relationship between the CG model 160 and the hand 150 in the depth direction can be determined in units of pixels. That is, even if the hand 150 is located behind the CG model 160, the CG model 160 is drawn in front of the hand 150. This allows a user to experience an immersive feeling.

Third Embodiment

In the first embodiment, subject extraction information is calculated on the basis of color information on a subject region. However, the present invention is not limited to a case where subject extraction information is calculated on the basis of only color information on a subject region. A background region that is not a subject region may be used.

In this embodiment, a method will be described of determining a subject region where a noise is small by removing noise in a background region using not only color information on the inner region of the contour 310 of the hand 150 in an instruction image but also color information in a background region outside the contour 310.

The functional configuration of a real-time image synthesis apparatus according to this embodiment will be described with reference to the block diagram of a real-time image synthesis apparatus according to the first embodiment illustrated in FIG. 1. Only points different from the first embodiment will be described below. The other points of which no description is made below are the same as the first embodiment.

Figure 7A:
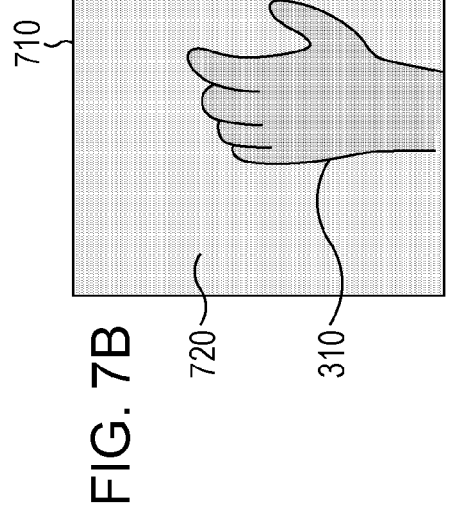
FIGS. 7A, 7B, and 7C are schematic diagrams illustrating a real image, an instruction image, and a synthesized image, respectively, according to a third embodiment of the present invention.
Figure 7B:
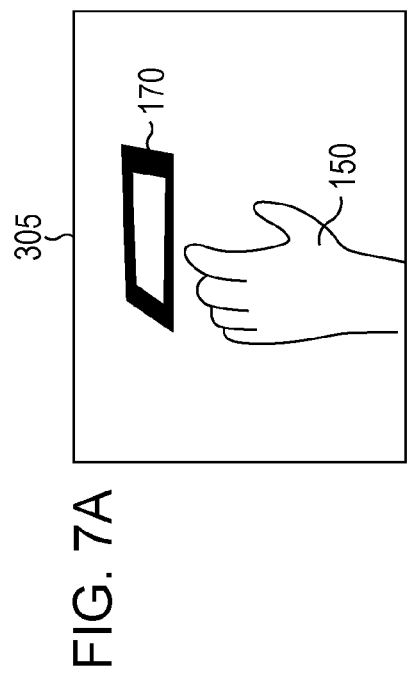
Figure 7C:
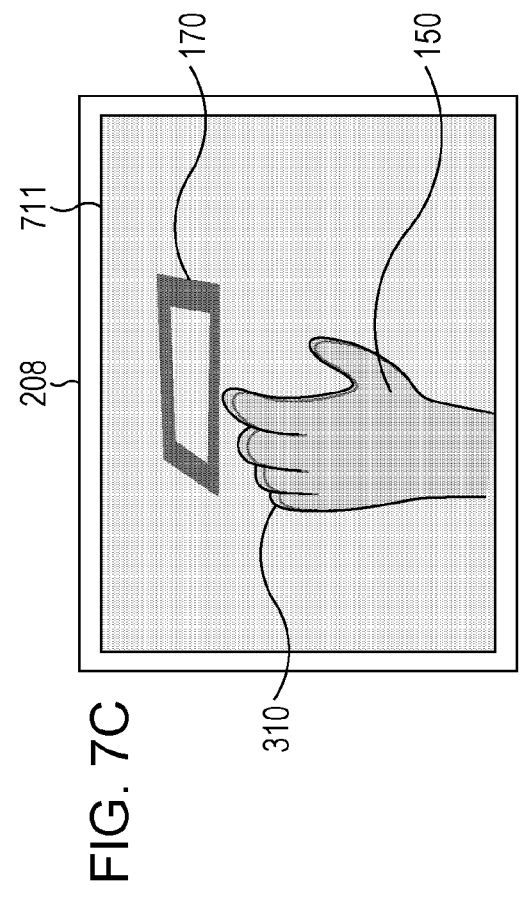

The instruction image drawing unit 107 according to this embodiment synthesizes an instruction image 710 illustrated in FIG. 7B with the real image 305 that has been input and displays a synthesized image 711 illustrated in FIG. 7C. It is desired that the inner region of the contour 310 and the background region outside the contour 310 be drawn in different colors so as to distinguish between them in the instruction image 710 and be semitransparent at the time of synthesis.

When an instruction image is displayed on the displays 208 and 209 achieving stereographic display, it is desired that the instruction image be displayed on only one of these displays. The reason for this is that a user adjusts the hand 150 in the depth direction after viewing instruction images on the displays for both eyes and a time taken to prepare for image acquisition is increased. By displaying the instruction image on a display for one eye, subject extraction information can be more rapidly determined.

The subject extraction information calculation unit 102 according to this embodiment calculates the final subject region extraction information on the basis of color information on a subject region and color information on a background region. This calculation processing will be described in detail later.

A process according to this embodiment will be described with reference to the flowchart illustrating a process according to the first embodiment in FIG. 4. Only points different from the first embodiment will be described below. The other points of which no description is made below are the same as the first embodiment.

In step S412, the subject extraction information calculation unit 102 performs background extraction information acquisition processing to acquire color information not only on a subject region inside the contour 310 but also on a background region outside the contour 310. The process proceeds to step S413.

Figure 8:
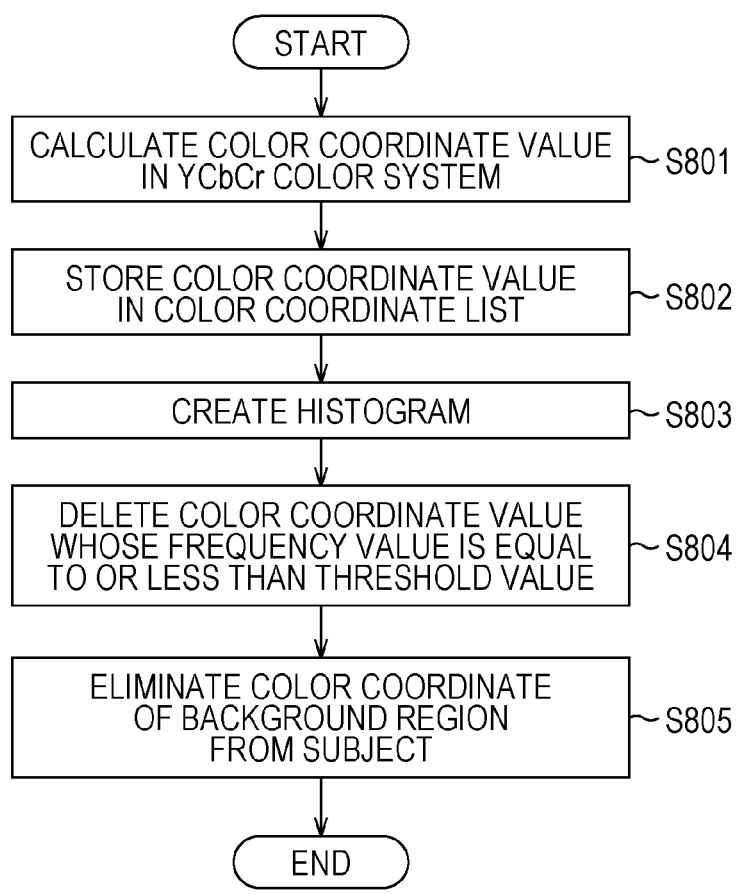
FIG. 8 is a flowchart illustrating a subject extraction information calculation process according to the third embodiment.

In step S413 according to this embodiment, subject extraction information is calculated on the basis of the inner region of the contour 310 and the background region. This subject extraction information calculation will be described in detail below with reference to a flowchart illustrated in FIG. 8.

In step S801, the subject extraction information calculation unit 102 converts the input color information on the subject region and the input color information on the background region into coordinate values in the YCbCr color system, respectively.

In step S802, the subject extraction information calculation unit 102 generates a color coordinate list in the YCbCr color system for each of the input color information on the subject region and the input color information on the background region. That is, Y, Cb, and Cr color coordinate lists for the subject region and Y, Cb, and Cr color coordinate lists for the background region are generated.

In step S803, like in step S503, the subject extraction information calculation unit 102 creates a histogram for each of the subject region color coordinate list and the background region color coordinate list.

In step S804, like in step S504, the subject extraction information calculation unit 102 specifies a color coordinate value whose frequency value is equal to or less than a predetermined threshold value in the subject region color coordinate list and the background region color coordinate list and deletes the specified color coordinate value from the color coordinate lists.

Figure 9:
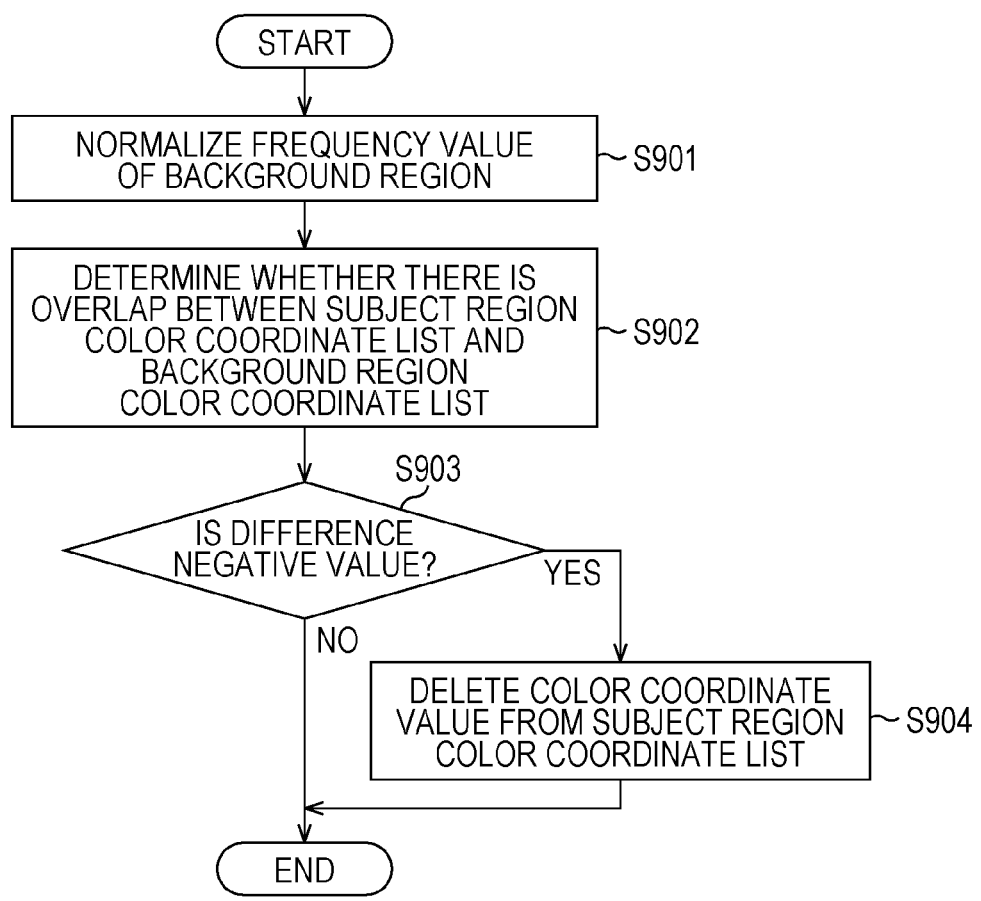
FIG. 9 is a flowchart illustrating a process of deleting a color coordinate value of a background region from a subject region color coordinate list according to the third embodiment.

In step S805, the subject extraction information calculation unit 102 deletes a background region color coordinate value from the subject region color coordinate list. This processing will be described with reference to a flowchart illustrated in FIG. 9.

In step S901, the subject extraction information calculation unit 102 normalizes a frequency value Hb in the histogram for the background region color coordinate list relative to a frequency value Ha in the histogram for the subject region color coordinate list. This normalization is performed by calculating a sum A of the frequency values Ha in the subject region histogram and a sum B of frequency values Hb in the background region histogram and obtaining a normalized frequency value Hc in the background region using the following equation 1.

$$Hc = Hb * A/B \quad \text{(Equation 1)}$$

In step S902, it is determined whether there is a color coordinate overlap between the subject region color coordinate list and the background region color coordinate list. When it is determined that there is a color coordinate overlap, the normalized background region frequency value Hc of the color coordinate is subtracted from the subject region frequency value Ha of the color coordinate in step S903. It is determined whether the difference between them is a negative value. When a result of the subtraction is a negative value, the process proceeds to step S904 in which the value of the color coordinate having an overlap is deleted from the subject region color coordinate list. When a result of the subtraction is not a negative value, the deletion is not performed.

The subject extraction information calculation unit 102 outputs the subject region color coordinate list to the image synthesis unit 105.

Thus, a subject extraction information is determined on the basis of not only subject region color information but also background region color information. As a result, a phenomenon in which a background region is erroneously determined as a subject region can be prevented. That is, in a background region, a subject region where a noise is small can be determined.

Fourth Embodiment

In the third embodiment, the subject extraction information calculation unit 102 acquires color information under a condition where the region of the hand 150 that is a subject and a background region are close to each other as represented by the instruction image 710 in FIG. 7. When the real hand 150 extends off the inner region of the contour 310 illustrated in FIG. 7, color information on the hand 150 is stored as color information on a background region.

That is, since color information on a skin-colored region is stored as color information on a background region, a color coordinate representing a part of a skin color is deleted from a subject region color coordinate list. After the deletion of the color coordinate representing a part of a skin color, a hole is made in the region of the hand 150. Since a part of the CG model 160 is displayed in the hole of the hand, a user has an unnatural feeling.

In this embodiment, a method of providing an instruction image 1020 illustrated in FIG. 10B will be described. The instruction image 1020 includes a circular region 1040 from which color information on a subject region is acquired and a non-acquisition region 1010 between the circular region 1040 and a background region 720.

Figure 10B:
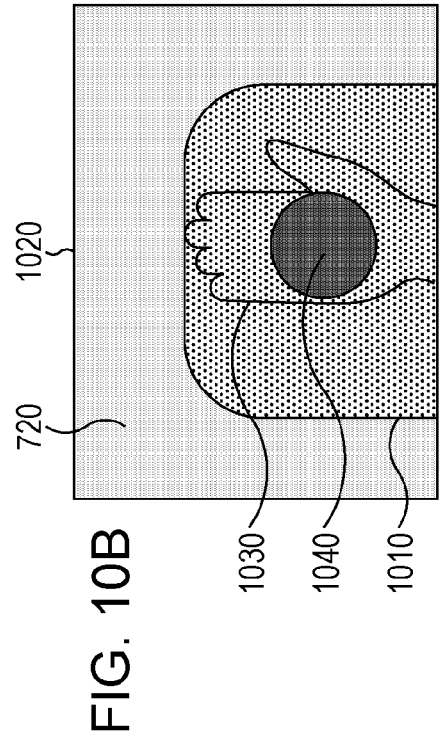
FIGS. 10A, 10B, and 10C are schematic diagrams illustrating a real image, an instruction image, and a synthesized image, respectively, according to a fourth embodiment of the present invention.
Figure 10A:
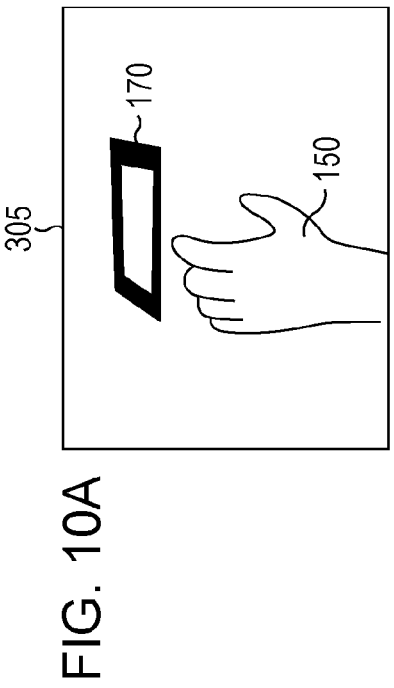
Figure 10C:
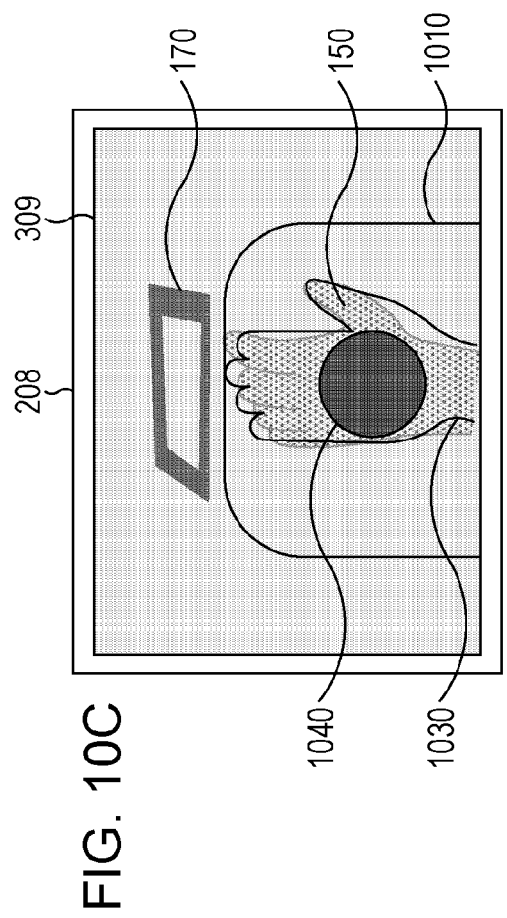

In order to achieve this embodiment, an instruction image displayed by the instruction image drawing unit 107 in the third embodiment is changed to the instruction image illustrated in FIG. 10B.

In the third embodiment, the acquisition of subject color information is performed using the contour of a hand. However, in this embodiment, subject color information is acquired from the circular region 1040. In addition, the contour of a hand is changed to a more abstract contour 1030. This change is performed so as to prevent a user from spending time adjusting the position of a hand of the user with due attention to detail of a contour. As a result, a time taken to adjust a hand position is reduced.

In order to instruct the shape of a hand at the time of image capturing, the contour 1030 may be displayed. At that time, an abstract contour like the contour 310 in FIG. 7 making a user not aware of the adjustment of a hand to the contour is preferably used.

The subject extraction information calculation unit 102 according to this embodiment may change a subject color acquisition region and a background region on the basis of the instruction image 1020 by performing processing similar to processing according to the second embodiment.

Thus, at the time of acquisition of subject extraction information, by providing a margin between a subject color information acquisition region and background color information acquisition region, a time a user spends to adjust the hand 150 in an instruction image can be reduced.

That is, even in the case of content for which a plurality of users wait in line, it is possible to cause each user to store hand extraction information in short time before experience and perform adjustment for each user. This adjustment suppresses the generation of noise in the hand 150 of a user and the region of the CG model 160 and allows a user to experience an immersive feeling.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an embodiment of the present invention, it is possible to more rapidly determine a subject region in an image captured by a camera having a movable viewpoint by creating an instruction image used to extract subject information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117890, filed Jun. 6, 2014, which is hereby incorporated by reference herein in its entirety.

What is claimed is:
1. An information processing apparatus comprising:
a display control unit configured to generate a synthesized image by synthesizing an extraction image including a subject and an instruction image representing a first acquisition region from which color information on the subject is acquired and display the synthesized image on a display unit;

a subject color information acquisition unit configured to acquire color information on the subject from the first acquisition region represented by the instruction image in the synthesized image;

a background color information acquisition unit configured to acquire color information on a background of the subject from a region not including the first acquisition region and a color information non-acquisition region that is adjacent to the first acquisition region and is set in advance;

a subject extraction information determination unit configured to determine extraction information of the subject based on the color information on the subject acquired by the subject color information acquisition unit and the color information on the background acquired by the background color information acquisition unit; and a subject extraction information output unit configured to output the extraction information of the subject determined by the subject extraction information determination unit.

2. The information processing apparatus according to claim 1, wherein the subject extraction information determination unit determines the extraction information of the subject by removing the color information on the background from the color information on the subject.

3. The information processing apparatus according to claim 1,
wherein the subject color information acquisition unit acquires coordinate values in a YCbCr color system from an image as the color information on the subject and generates a subject color information list, and
wherein, when a coordinate value whose frequency value is less than a threshold value in a histogram of the coordinate values in the subject color information list, the subject extraction information determination unit deletes the coordinate value from the subject color information list.

4. The information processing apparatus according to claim 1,
wherein the background color information acquisition unit acquires coordinate values in a YCbCr color system from an image as the color information on the background and generates a background color information list, and
wherein, when a coordinate value whose frequency value is less than a threshold value in a histogram of the coordinate values in the background color information list, the subject extraction information determination unit deletes the coordinate value from the background color information list.

5. The information processing apparatus according to claim 1,
wherein the subject color information acquisition unit acquires coordinate values in a YCbCr color system from an image as the color information on the subject and generates a subject color information list,
wherein the background color information acquisition unit acquires coordinate values in a YCbCr color system from an image as the color information on the background and generates a background color information list, and wherein the subject extraction information determination unit deletes a color coordinate value included in both the subject color information list and the background color information list from the subject color information list.

6. The information processing apparatus according to claim 5,
wherein the subject extraction information determination unit normalizes at least one of a frequency value in the histogram calculated from the color information on the background and a frequency value in the histogram calculated from the color information on the subject, subtract, from a frequency value of a color coordinate value in the subject color information list, a frequency value of a corresponding color coordinate value in the background color information list, and deletes, when a result of the subtraction is a negative value, the color coordinate value from the subject color information list.

7. The information processing apparatus according to claim 1, wherein the instruction image also represents the color information non-acquisition region.

8. The information processing apparatus according to claim 1, wherein the display control unit synthesizes an image in which a contour of the subject is drawn with the extraction image as the instruction image and displays the synthesized image.

9. The information processing apparatus according to claim 8, wherein a simple figure is drawn as the contour of the subject in the instruction image.

10. The information processing apparatus according to claim 9, wherein the simple figure is a circle, an ellipse, or a polygon.

11. The information processing apparatus according to claim 1, wherein, when an image is displayed for both eyes of a user using stereo displays, the synthesized image is displayed on only one of these displays.

12. The information processing apparatus according to claim 1, wherein the subject is a hand of a user.

13. The information processing apparatus according to claim 1, further comprising a subject region determination unit configured to determine a region of the subject in an input image different from the extraction image on the basis of the extraction information of the subject output from the subject extraction information output unit.

14. The information processing apparatus according to claim 13, further comprising a synthesizing unit configured to synthesize a CG image with a region other than the region of the subject determined by the subject region determination unit.

15. The information processing apparatus according to claim 14, wherein the synthesizing unit does not synthesize the CG image with the region of the subject.

16. An information processing method comprising:
generating a synthesized image by synthesizing an extraction image including a subject and an instruction image representing a first acquisition region from which color information on the subject is acquired;
displaying the synthesized image on a display unit;
acquiring color information on the subject from the first acquisition region represented by the instruction image in the synthesized image;
acquiring color information on a background of the subject from a region not including the first acquisition region and a color information non-acquisition region that is adjacent to the first acquisition region and is set in advance;

determining extraction information of the subject based on the color information acquired on the subject and the color information acquired on the background; and outputting the determined extraction information.

17. A computer-readable storage medium storing computer-executable instructions which when executed perform an information processing method comprising:

generating a synthesized image by synthesizing an extraction image including a subject and an instruction image representing a first acquisition region from which color information on the subject is acquired;

displaying the synthesized image on a display unit;

acquiring color information on the subject from the first acquisition region represented by the instruction image in the synthesized image;

acquiring color information on a background of the subject from a region not including the first acquisition region and a color information non-acquisition region that is adjacent to the first acquisition region and is set in advance;

determining extraction information of the subject based on the color information acquired on the subject and the color information acquired on the background; and outputting the determined extraction information.

\* \* \* \* \*